US008003574B2

(12) United States Patent
Debord et al.

(10) Patent No.: US 8,003,574 B2
(45) Date of Patent: Aug. 23, 2011

(54) INHIBITING NAPHTHENATE SOLIDS AND EMULSIONS IN CRUDE OIL

(75) Inventors: Justin D. Debord, Katy, TX (US); Piyush Srivastava, Houston, TX (US); Christopher Gallagher, Broken Arrow, OK (US); Samuel Asomaning, Sugar Land, TX (US); Paul Hart, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 124 days.

(21) Appl. No.: 12/196,781

(22) Filed: Aug. 22, 2008

(65) Prior Publication Data
US 2009/0036329 A1 Feb. 5, 2009

Related U.S. Application Data

(63) Continuation-in-part of application No. 12/095,880, filed as application No. PCT/US2006/061343 on Nov. 29, 2006, now abandoned.

(60) Provisional application No. 60/741,581, filed on Dec. 2, 2005.

(51) Int. Cl.
C09K 8/52 (2006.01)
E21B 37/06 (2006.01)
(52) U.S. Cl. .................... 507/90; 166/304; 507/240
(58) Field of Classification Search .............. 507/90, 507/240; 166/304
See application file for complete search history.

(56) References Cited

U.S. PATENT DOCUMENTS

| 4,678,605 | A | 7/1987 | Geke et al. |
| 5,047,325 | A | 9/1991 | Pronovost et al. |
| 5,863,415 | A | 1/1999 | Zetlmeisl |
| 6,214,777 | B1 | 4/2001 | Li et al. |
| 6,663,841 | B2 | 12/2003 | Salma et al. |
| 2002/0023752 | A1* | 2/2002 | Qu et al. .................... 166/308 |
| 2005/0282711 | A1 | 12/2005 | Ubbels et al. |
| 2005/0282915 | A1 | 12/2005 | Ubbels |

FOREIGN PATENT DOCUMENTS

WO  WO2006025912 A2  3/2006

OTHER PUBLICATIONS

Rousseau et al.; "Calcium Carbonate and Naphthenate Mixed Scale in Deep-Offshore Fields," SPE 68307, SPE 3rd International Symposium on Oilfield Scale, Aberdeen, UK, Jan. 30-31, 2001, pp. 1-7.
Vindstad et al.; "Fighting Naphthenate Deposition at the Heidrun Field," SPE 80375, SPE 5th International Symposium on Oilfield Scale, Aberdeen, UK, Jan. 29-30, 2003, pp. 1-7.

* cited by examiner

*Primary Examiner* — Timothy J. Kugel
(74) *Attorney, Agent, or Firm* — Mossman, Kumar & Tyler, PC

(57) ABSTRACT

Naphthenic acid solids and/or emulsions can be inhibited by introducing an additive to crude oil prior to or concurrent with the deprotonation of the naphthenic acids present in the crude oil. The additives may be surfactants and can be amines, quaternary ammonium compounds, quaternary phosphonium compounds, and mixtures of both. The additives may also be linear compounds having at least two carboxylic acid or acrylic acid functional moieties.

34 Claims, No Drawings

INHIBITING NAPHTHENATE SOLIDS AND EMULSIONS IN CRUDE OIL

CROSS REFERENCE TO RELATED APPLICATIONS

This application is a continuation-in-part of the U.S. patent application having a Ser. No. 12/095,880 filed Jun. 2, 2008, now abandoned, which claims priority of PCT Application No. PCT/US06/61343 which was filed on 29 Nov. 2006 designating the United States as a Designated State, which claims priority from the Provisional Patent Application having the Ser. No. 60/741,581 that was filed on Dec. 2, 2005.

BACKGROUND OF THE INVENTION

1. Field of the Invention

The present invention relates to solids inhibitors. The present invention particularly relates to solids inhibitors useful for applications in which naphthenic acid is present.

2. Description of the Prior Art

The forming of scale during the production of crude oil has long been a problem. The formation of scale can slow oil production rate and, in extreme circumstances, stop production completely. Some scale species are formed from the interaction of metals and inorganic anions. For example, the combination products of calcium cation with carbonate anion or phosphate anion will precipitate from the water in which the ions are carried to form scale deposits when the concentrations of these anions and cations exceed the solubility of the reaction product.

Another form of scale results from sulfides. The metal sulfide scale may be, for example, iron sulfide. Alternatively, the metal sulfide may be lead sulfide or zinc sulfide or a combination of iron or lead or zinc sulfides. The iron sulfide may be troilite (FeS) or pyrite ($FeS_2$). Alternatively, the iron sulfide may be mackinawite ($Fe_9 S_8$) or phyrrhotite ($Fe_7S_8$).

Generally, the most common scale forming ions are calcium and barium, but sodium, carbonate, bicarbonate, chloride, sulfate, and strontium are also recognized as scaling species. The most common speciation of these combined scaling ions are: calcium carbonate ($CaCO_3$), calcium sulfate ($CaSO_4$), barium sulfate ($BaSO_4$), and strontium sulfate ($SrSO_4$). In addition, there are less common scale species, such as calcium fluoride ($CaF_2$), iron sulfide ($Fe_xS_{x+1}$), zinc sulfide (ZnS), lead sulfide (PbS) and sodium chloride (NaCl).

In addition to the scaling species described above, crude oil will often include other materials which may form scale or scale like deposits down stream. For example, most crude oil will have agglomerative materials such as paraffins and asphaltenes. Most crude oil will also have clays and silica. All of these materials are known to contribute to problems with downstream equipment used to move and process crude oil.

It is widely known in the art that the processing of crude oil in its various fractions has led to damage of the iron-containing metal surfaces of associated apparatus due to naphthenic acid corrosion. It is also known that corrosion is not the only problem associated with the production, handling, and processing of crude oils having high levels of naphthenic acid. Naphthenic acids can also interact with metals, particularly calcium and sodium, to form solids and emulsions. These materials can form scale and block strainers and other equipment downstream from oil wells.

One method of treating naphthenic solids known to the art is to acidify production fluid as it leaves the well bore. It is known to use acetic acid and mineral acids for this process. One disadvantage of using acids at this stage of production is the cost of the acids, which may be required at high treatment levels. Some of these acids are dangerous and can pose safety hazards. It would be desirable in the art to mitigate or eliminate naphthenic acid solids formation downstream without resorting to the use of acetic or mineral acid treatment.

SUMMARY OF THE INVENTION

In one aspect, the present invention is a method useful for inhibiting the formation of naphthenic acid solids and/or naphthenic acid emulsions in crude oil in and/or downstream from an oil well comprising introducing an additive effective for inhibiting the formation of naphthenic acid solids and/or naphthenic acid emulsions into crude oil at a point in the crude oil production process prior to or concurrent with the deprotonation of the naphthenic acid.

In another aspect, the invention is an additive effective for inhibiting the formation of naphthenic acid solids and/or naphthenic acid emulsions in crude oil present in a well and/or downstream from an oil well comprising a surfactant.

DESCRIPTION OF THE PREFERRED EMBODIMENTS

As commonly used, naphthenic acid is a collective term for certain organic acids present in various crude oils. Higher concentrations of these organic acids are often found in heavy crude oils, particularly those that have been subject to biodegradation. Although there may be other organic acids present, it is understood that the source of naphthenate solids and naphthenate emulsions in crude oils is composed of acids which are naphthenic or aliphatic in character, i.e., those having a saturated ring structure such as, but not limited to, the following general structures:

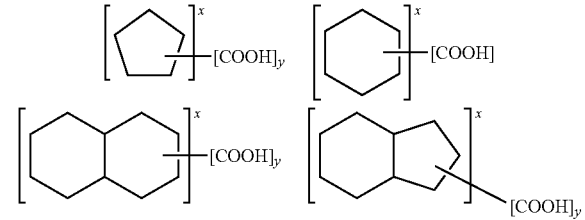

wherein x and y may be 1 or greater. The molecular weight of naphthenic acid can extend over a large range. For the purposes of this invention, the naphthenic acids include the other saturated fatty acids occurring in crude oils including acids having one or more cyclohexane and/or cyclopentane groups. Also, while the acid groups may be on the rings, they may also occur elsewhere on the molecules such as on aliphatic side chains.

In one embodiment, the invention is a method for preventing or mitigating the formation of naphthenic acid solids. While not wishing to be bound by any theory, it is believed that at least one method by which naphthenic acid solids are formed is by the interaction of naphthenic acid anions and metal cations.

In one embodiment, the additives useful with the invention are surfactants. In one such embodiment, the additives are cationic surfactants. One type of surfactant useful with the method of the invention is quaternary ammonium compounds. The quaternary ammonium compounds useful with the invention include those that are described by the general formula $R_4N^+$. These compounds include a central nitrogen atom bound to four (4) R groups, resulting in a permanent cationic charge. The compound can also be reacted with an anion to neutralize the charge and are known as quaternary ammonium salts and have the general formula: $R_4N^+X^-$.

In another embodiment, the surfactant may be an ionic surfactant. One type of surfactant useful with the method of the invention is organic amine compounds. The amines useful with the invention include those that are described by the general formulae $NH_3$, $RNH_2$, $R_2NH$ or $R_3N$. With either embodiment, the R groups can represent hydrophilic (polar) and/or hydrophobic (nonpolar) substituents which includes a very large number of possible substitutions including —H, alkyl, alkylene, aryl, amide, ester, ether, amine and others and these substitutions can be arranged in various combinations. In one embodiment, at least one of the R groups is an alkyl chain having from 1 to 50 carbons that optionally may include substituents such as O, N, S, and P. Exemplary substituents of this type include, but are not limited to ethers, alcohols, aldehydes, acids, amines, amides, ketones aryls, alkenes, dienes, trienes, multi-enes, esters, anhydrides and halogens.

In some embodiments, the additive has an ethoxylated substituent composed of 1 to 25 ethylene oxide and/or propylene oxide units. In other embodiments, the amines useful with the invention are: ethoxylated oleyl amine, ethoxylated coconut fatty amine, ethoxylated N-tallow alkyltrimethylenediamine, ethoxylated stearyl amine, coconut fatty amine oleate, N,N-bisaminopropyl tallow fatty amine, tallow fatty propylene polyamine, ethoxylated alkyl propylene diamine, oleyl propylene diamine. Mixtures of these compounds may also be used.

In some embodiments, the additive is a quaternary ammonium compound having the general formula: $R_4P^+X^-$ wherein at least one R group consists of an alkyl (cyclic or non-cyclic) chain composed of 1 to 24 carbon atoms. In other embodiments, the additive has an ethoxylated substituent composed of 1 to 25 ethylene oxide or propylene oxide units.

In some embodiments of the invention, the quaternary ammonium compounds useful with the invention are: octadecylmethyl [polyoxyethylene(15)] ammonium chloride, octadecylmethyl [polyoxyethylene (2)] ammonium chloride Cocodecylmethyl [polyoxyethylene (15)] ammonium chloride, cocodecylmethyl [polyoxyethylene (2)] ammonium chloride cocoalkylmethyl-bis(2-hydroxyethyl) ammonium chloride, cocoalkylmethyl [polyoxyethylene (15)] ammonium chloride, cocoalkylmethyl [polyoxyethylene (2)] ammonium chloride, oleylmethylbis(2-hydroxyethyl) ammonium chloride, tris(2-hydroxyethyl)tallowalkyl ammonium acetate, ethoxylated quaternary ammonium compound. Mixtures of these compounds may also be used.

In another embodiment, the additives useful with the invention are quaternary phosphonium compounds. The quaternary phosphonium compounds useful with the invention are those described by the general formula $R_4P^+$. These compounds include a central phosphorus atom bound to four (4) R groups, resulting in a permanent cationic charge. These compounds can also be reacted with an anion to neutralize the charge and are known as quaternary phosphonium salts and have the following formula: $R_4P^+X^-$.

The R groups can represent hydrophilic (polar) and/or hydrophobic (nonpolar) substituents which includes a very large number of possible substitutions including —H, alkyl, alkylene, aryl, amide, ester, ether, amine and others and these substitutions can be arranged in various combinations. One such compound is, for example, tetrakis hydroxymethyl phosphonium sulfate.

Another group of compounds that can be used as additives with the present invention are linear compounds having from 2 to 50 carboxylic and/or acrylic acid groups. For the purposes of the present invention, the subject linear compounds are those having backbones primarily composed of carbon and hydrogen wherein branching is limited. The linear compounds useful with present invention may have minor amounts of hetero-atoms in the backbone. For example, the backbone may include nitrogen, oxygen, sulfur and/or phosphorous.

The carboxylic and/or acrylic acid groups are generally incorporated as substituents along the back bone and may be present, in some embodiments, as moieties such as:

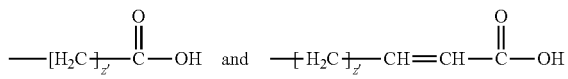

wherein z' is an integer of from 0 to 6. Exemplary compounds may be, but are not limited to, polymers having the general formula:

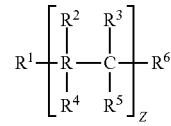

wherein:
Z is an integer of from 2 to 75;
for each iteration, R is independently a carbon, nitrogen, oxygen, sulfur and phosphorous,
$R^1$ and $R^6$ are independently H or $CH_3$;
for each iteration and as further limited herein, sometimes $R^2$ or $R^3$ or both $R^2$ and $R^3$ are a carboxylic acid or an acrylic acid moiety;
for each iteration, $R^4$ and $R^5$ and, when not a carboxylic acid or an acrylic acid moiety, $R^2$ and $R^3$ are independently: an electron pair, a H, an aliphatic moiety, or an aliphatic moiety having a functionality that is not a carboxylic acid or acrylic acid functionality.

Exemplary linear compounds having polycarboxylic and/or polyacrylic acid functionality useful with the present invention include those selected from: polycarboxylated polymer (MW 1000) sold under tradename Acumer 1000 and Optidose 1000, polycarboxylated polymer (MW 2000) sold under tradename Acumer 2000 and Optidose 2000, polycarboxylated polymer (MW 5000) sold under tradename Acumer 5000 and Optidose 5000 and polycarboxylated polymer (MW 8000 sold under tradename Acumer 8000 and Optidose 8000). Preferably, these compounds are used in the form of salts and mixtures of these compounds may be used.

Other materials may also be used as the additive of the present invention. Any surfactant that can interact with a naphthenic acid to prevent a subsequent interaction with a metal to produce solids or emulsion solids can be used with the present invention. Compounds considered useful as the additive of the present invention include but are not limited to: oxyalkylated alkylphenol resins; oxyalkylated polyamines; alkylaryl polyether sulfate salt/MEA; C18-amines; sulfosuccinates, EGMBE; branched polyester-amides; polyisobutenyl succinic anhydride; dithiocarbamates; alkyl benzene sulfonic acid; and mixtures thereof.

Exemplary materials useful as the additive of the present invention include oxyalkylated alkylphenolic resin, oxyalkylated polyamine resin, oleylamine, oleyl ethoxylated amine, tallowalkylamine, tallow ethoxylated amine, sulfosuccinate, stearylamine, methanesulfonic acid, Jeffamine, and Dioctylsulfosuccinate.

In one embodiment of the method of the present invention, the additive is introduced down hole prior to the pH of the crude oil increasing above the deprotonation pH for the naphthenic acids present in the crude oil. The pH where deprotonation can occur will vary depending upon the specific naphthenic acids present and the other compounds present in the crude oil. This range may be wide and can possibly vary from as low as about 4.5 to as high as about 8. However, in many applications deprotonation will occur at a pH of about 5.5 and in others at about 6.5.

While crude oil does include a hydrocarbon phase, it also will include at least some brine that is co-produced from the reservoir. The inorganic and water soluble organics are often present as an emulsion in crude oil with this brine serving to form the emulsion. For purposes of simplification, in this application the pH of the aqueous components is described as the pH of the crude oil, but it is acknowledged that, strictly speaking, the hydrocarbon phase does not have a pH since the hydronium ion is not present in a non-aqueous environment.

As crude oil enters a well bore and begins to ascend to the surface of the earth, the crude oil is subject to decreasing pressure. As a result, $CO_2$ may evolve from the crude oil decreasing the acidity of the crude oil. By introducing the additive at a point in the well where the crude oil has a pH lower than or the same as the deprotonation pH for the naphthenic acids present, the additive interacts with the naphthenic acids while they are still protonated or as they become deprotonated. While not wishing to be bound by any theory, it is believed that the additive and naphthenic acid form an adjunct resistant to forming solids with metal ions and thus does not form solids or emulsions downstream. It is also believed that once the naphthenic acid becomes deprotonated in the presence of a metal ion, such as calcium or sodium, the additive becomes less effective or perhaps completely ineffective at preventing the formation of solids and emulsions. Notwithstanding this, in one embodiment of the invention, the method is practiced in the substantial absence of adding a mineral acid or acetic acid to the additive or to the production fluid prior to the addition of the additive downhole.

In addition to interfering with or supplanting the interaction of the metal ions with the naphthenic acids in the crude oil, the additives useful with the present invention may also impart demulsification and/or dispersant properties which may further inhibit the formation of naphthenic deposits.

The additives of the present invention can be introduced into crude oil at any point in a crude oil production process where the crude oil has a pH that is at or lower than the protonation point for the naphthenic acids being treated. In most applications, this will be downhole. The additives may be introduced into the crude oil using any method known to those of ordinary skill in the art to be useful. For example, the additive may be added using a gear pump and capillary tubing running down to a point in the well bore. In one embodiment, the tubing is run to the point in the well bore where the crude oil enters the well bore, this point often being referred to as the production zone of the oil well. In another embodiment, a series of samples of crude oil are taken from the well at multiple points and the exact location where the pH of the crude oil is 5.5, the point of deprotonation for this well, is determined and the capillary tubing is extended to this point.

In one embodiment of the present invention an automated additive injection system is used to introduce the additive into the crude oil. Typically, such an injection system will include a source of additive, a pump, at least one controller for setting the flow rate. In another embodiment, the controller is SENTRY SYSTEM™ additive injection system.

The additive of the present invention may be admixed with or co-injected with other additives useful in the production of crude oil. For example, they may be admixed with or co-injected with defoamers, asphaltene inhibitors, corrosion inhibitors, and any other materials that do not interfere with the function of the additives in mitigating the formation of naphthenic solids. In one embodiment, the additives of the present invention are co-injected with conventional acid inhibitors and demulsifiers.

The method of the present invention is particularly useful with crude oils that have a history of being hard to separate. For example, naphthenic solids and emulsions often form difficult to handle rag layers in separators. They may also be observed as sticky agglomerates with clays and sand in other downstream equipment such as dehydrators, solids separators, and strainers. The emulsions and solids can form thick sediments, or in extreme cases, can cause the formation of stable emulsions that can render inoperative or even damage downstream equipment. Any of these phenomena indicate that the oil wells producing the subject crude oil might be a good candidate for treatment using the method of the present invention.

The present invention is for an additive that functions to reduce the formation of solids and emulsions both in an oil well and in downstream equipment. For purposes of the present invention, downstream equipment refers to the pipes, pipelines, vessels, truck, and the like used to transport crude oil from the oil field to the refinery and to any equipment with which the crude oil comes into contact. For example, such equipment may include, but is not limited to separators, dehydrators, strainers, centrifuged, cyclones, and electrostatic precipitators.

EXAMPLES

The following examples are provided to illustrate the present invention. The examples are not intended to limit the scope of the present invention and they should not be so interpreted. Amounts are in volume parts or volume percentages unless otherwise indicated.

Example 1

Bottle test of an Active Inhibitor Additive

Aliquots of a representative brine and a crude oil are admixed in a glass vial. The inhibitor is added at from 1 ppm to 50,000 ppm. The bottle is shaken and observed for the evolution of aggregation, pad, or ARN* layer. No aggregation, pad, or ARN layer is observed with the following compounds:
octadecylmethyl[polyoxyethylene(15)ammonium chloride;
cocodecylmethyl[polyoxyethylene(15)ammonium chloride;
cocoalkylmethyl-bis(2-hydroxyethyl)ammonium chloride;
cocoalkylmethyl[polyoxyethylene (15)]ammonium chloride;
oleylmethylbis(2-hydroxyethyl)ammonium chloride;
tetrakis hydroxymethyl phosphonium sulfate;
polycarboxylated polymer (mw 1000);
polycarboxylated polymer (mw 2000);
polycarboxylated polymer (mw 5000);
polycarboxylated polymer (mw 8000);
oxyalkylated alkylphenolic resin;
oxyalkylated polyamine resin;
alkylaryl polyether sulfate;

ethoxylated coconut fatty amine;
ethoxylated N-tallow alkyltrimethylenediamine;
ethoxylated stearyl amine;
coconut fatty amine oleate;
N,N-bisaminopropyl tallow fatty amine;
tallow fatty propylene polyamine;
ethoxylated Alkyl propylene diamine;
Ooeyl propylene diamine;
oleylamine;
oleyl ethoxylated amine;
tallowalkylamine;
tallow ethoxylated amine;
sulfosuccinate;
stearylamine;
Jeffamine;
dithiocarbamate;
tetrathiocarbamate;
polyesteramides;
and
dioctylsulfosuccinate.

Comparative Example A

Bottle Test of a Non-Active Inhibitor Additive

Example 1 is reproduced substantially identically except that a modified tannin is used as the additive. Both an aggregation and an ARN layer are noted.

An ARN layer is a "plastic-like" layer that forms at the interface of the organic and brine solutions. It can be strongly indicative of calcium naphthenate and its formation or lack therefore provides a very good visual clue as to the inhibition activity of the added product.

Example 2

A producer of an oil filed had been managing calcium naphthenate emulsions and deposits via acid at a rate of 750-900 gallons per day. Non-acid inhibitor products were tested for efficacy via a calcium naphthenate test using samples from the field. A example of the invention, an poly (oxyethylene)-ammonium chloride, was selected and formulated for a field trial. The product achieved the key performance indicators: reduction of acetic acid dosage (−25%), amount of water to cargo (<0.5%) and water quality (good) while maintaining no formed naphthenate emulsion or deposit. Prior to chemical addition, deposits were evident.

What is claimed is:

1. A method for inhibiting the formation of naphthenic acid solids and/or naphthenic acid emulsions in crude oil in and/or downstream from an oil well comprising introducing an additive effective for inhibiting the formation of naphthenic acid solids and/or naphthenic acid emulsions into a crude oil production process prior to or concurrent with deprotonation of the naphthenic acid.

2. The method of claim 1 wherein the additive is introduced downhole.

3. The method of claim 2 wherein the additive is introduced using injection.

4. The method of claim 3 wherein the additive is injected using an automated injection device.

5. The additive of claim 4 wherein the additive is selected from the group consisting of quaternary ammonium compounds, quaternary phosphonium compounds, linear compound having from 2 to 50 carboxylic and/or acrylic acid groups, and mixtures thereof.

6. The additive of claim 5 wherein the acid groups of the linear compound having from 2 to 50 carboxylic and/or acrylic acid groups are partially for fully neutralized.

7. The method of claim 2 wherein the additive is introduced at or immediately downstream of the production zone of the oil well.

8. The method of claim 1 wherein the additive is a surfactant.

9. The method of claim 8 wherein the surfactant is a cationic surfactant.

10. The method of claim 8 wherein the additive is an ionic surfactant.

11. The method of claim 10 wherein the additive is an amine having the general formulae: $NH_3$, $RNH_2$, $R_2NH$, and $R_3N$ wherein at least one R group consists of an alkyl (cyclic or non-cyclic) chain composed of 1 to 24 carbon atoms.

12. The method of claim 11 wherein the additive has an ethoxylated substituent composed of 1 to 25 ethylene oxide and/or propylene oxide units.

13. The method of claim 10 wherein the additive is selected from the group consisting of: ethoxylated oleyl amine, ethoxylated coconut fatty amine, ethoxylated N-tallow alkyltrimethylenediamine, ethoxylated stearyl amine, coconut fatty amine oleate, N,N-bisaminopropyl tallow fatty amine, tallow fatty propylene polyamine, ethoxylated alkyl propylene diamine, oleyl propylene diamine, and mixtures thereof.

14. The method of claim 1 wherein the additive is a quaternary ammonium compound.

15. The method of claim 14 wherein the additive is a quaternary ammonium compound having the general formula: $R_4N^+X^-$ wherein at least one R group consists of an alkyl (cyclic or non-cyclic) chain composed of 1 to 24 carbon atoms.

16. The method of claim 15 wherein the additive has an ethoxylated substituent of composed of 1 to 25 ethylene oxide units.

17. The method of claim 15 wherein the additive has an propoxylated substituent of composed of 1 to 25 propylene oxide units.

18. The method of claim 15 wherein the additive has an mixed ethoxylated propoxylated substituent of composed of 1 to 25 propylene and or ethylene oxide units.

19. The method of claim 14 wherein the additive is selected from the group consisting of: octadecylmethyl [polyoxyethylene(15)] ammonium chloride, octadecylmethyl [polyoxyethylene (2)] ammonium chloride Cocodecylmethyl [polyoxyethylene (15)] ammonium chloride, cocodecylmethyl [polyoxyethylene (2)] ammonium chloride cocoalkylmethylbis(2-hydroxyethyl) ammonium chloride, cocoalkylmethyl [polyoxyethylene (15)] ammonium chloride, cocoalkylmethyl [polyoxyethylene (2)] ammonium chloride, oleylmethylbis(2-hydroxyethyl) ammonium chloride, tris(2-hydroxyethyl)tallowalkyl ammonium acetate, ethoxylated quaternary ammonium compound and mixtures thereof.

20. The method of claim 1 wherein the additive is a linear compound having from 2 to 50 carboxylic and/or acrylic acid groups.

21. The method of claim 20 wherein the linear compound is a polymer.

22. The method of claim 21 wherein the polymer is selected from the group consisting of a polycarboxylated polymer (MW 1000), polycarboxylated polymer (MW 2000), polycarboxylated polymer (MW 5000), polycarboxylated polymer (MW 8000) and mixtures thereof.

23. The method of claim 20 wherein the acid groups are partially or completely neutralized by counter-ions prior to use.

24. The method of claim 1 wherein the additive is a quaternary phosphonium compound.

25. The method of claim 24 wherein the additive is a quaternary phosphonium compound having the general formula $R_4P^+X^-$ wherein at least one R group consists of an alkyl (cyclic or non-cyclic) chain composed of 1 to 24 carbon atoms.

26. The method of claim 25 wherein the additive has an ethoxylated substituent of composed of 1 to 25 ethylene oxide units.

27. The method of claim 25 wherein the additive has a propoxylated substituent of composed of 1 to 25 propylene oxide units.

28. The method of claim 25 wherein the additive has a mixed ethoxylated propoxylated substituent of composed of 1 to 25 propylene and or ethylene oxide units.

29. The method of claim 24 wherein the additive is tetrakis hydroxymethyl phosphonium sulfate or tetrakis hydroxymethyl phosphonium chloride.

30. The method of claim 1 wherein the pH of the crude oil into which the additive is introduced is 6.5 or lower.

31. The method of claim 1 wherein the additive is introduced in combination with other additives.

32. The method of claim 1 wherein the additive is introduced in the substantial absence of added acetic acid or a mineral acid.

33. An additive effective for inhibiting the formation of naphthenic acid solids and/or emulsions in crude oil in and/or downstream of an oil well comprising a surfactant, a linear compound having at least two carboxylic acid or acrylic acid functional moieties, and mixtures thereof.

34. The additive of claim 33 that is prepared in the substantial absence of acetic acid and/or a mineral acid.

* * * * *